(12) United States Patent
Newell

(10) Patent No.: US 11,554,652 B2
(45) Date of Patent: Jan. 17, 2023

(54) INTEGRATED COVER

(71) Applicant: Bessie Newell, Washington, DC (US)

(72) Inventor: Bessie Newell, Washington, DC (US)

( * ) Notice: Subject to any disclaimer, the term of this patent is extended or adjusted under 35 U.S.C. 154(b) by 0 days.

(21) Appl. No.: 17/196,045

(22) Filed: Mar. 9, 2021

(65) Prior Publication Data
US 2021/0276404 A1 Sep. 9, 2021

Related U.S. Application Data
(60) Provisional application No. 62/986,814, filed on Mar. 9, 2020.

(51) Int. Cl.
B60J 11/02 (2006.01)
B60J 11/04 (2006.01)

(52) U.S. Cl.
CPC ............... B60J 11/02 (2013.01); B60J 11/04 (2013.01)

(58) Field of Classification Search
CPC .................................. B60J 11/02; B60J 11/04
USPC ........................................................... 296/98
See application file for complete search history.

(56) References Cited

U.S. PATENT DOCUMENTS

| | | |
|---|---|---|
| 3,222,102 A | 12/1965 | Lucas |
| 4,856,842 A | 8/1989 | Ross et al. |
| 5,078,330 A * | 1/1992 | Hall ........................ B60J 11/02 150/166 |
| D323,803 S | 2/1992 | Shimasaki |
| 5,176,421 A * | 1/1993 | Fasiska ................... B60J 11/02 150/166 |
| 5,597,196 A * | 1/1997 | Gibbs ..................... B60J 11/02 160/326 |
| 6,547,313 B2 | 4/2003 | Syron |
| 7,458,630 B1 | 12/2008 | Marciano et al. |
| 7,967,366 B1 * | 6/2011 | Tellez ..................... B60J 11/02 296/136.02 |
| 2002/0125730 A1 * | 9/2002 | Burks ..................... B60J 11/02 296/98 |
| 2002/0157696 A1 * | 10/2002 | O'Brien ................. B60J 11/00 135/87 |
| 2005/0212322 A1 | 9/2005 | Porter |
| 2009/0242151 A1 * | 10/2009 | Chen ...................... B60J 11/02 160/370.22 |
| 2009/0288891 A1 * | 11/2009 | Budge ................... B60K 16/00 180/2.2 |

(Continued)

FOREIGN PATENT DOCUMENTS

CN 203854482 U 10/2014

Primary Examiner — Joseph D. Pape
(74) Attorney, Agent, or Firm — Maier & Maier, PLLC

(57) ABSTRACT

According to at least one exemplary embodiment, a method, system and apparatus for a vehicle cover may be shown and described. In an exemplary embodiment, a vehicle cover may be provided which is stored along or inside the bumper cover of a vehicle. The cover may be stored on a roller. A drawstring on the end of the cover may be exposed while the cover is stored. Pulling the drawstring may unroll the roller, thus exposing the cover. The cover may then be wrapped over a substantial portion of the vehicle and tied at the end of the vehicle opposite the roller. In an exemplary embodiment, removal of the cover is as simple as untying the end of the cover and pressing a button on the roller which activates the spring-loaded return mechanism which may roll the cover back into the roller.

10 Claims, 3 Drawing Sheets

(56) References Cited

U.S. PATENT DOCUMENTS

| | | | |
|---|---|---|---|
| 2012/0146358 A1* | 6/2012 | Sassi | B60J 11/02 296/136.12 |
| 2013/0233498 A1 | 9/2013 | Kaya et al. | |
| 2016/0009166 A1* | 1/2016 | Sassi | B60J 11/02 296/98 |
| 2016/0075222 A1* | 3/2016 | Chen | B60J 11/02 160/239 |
| 2017/0166040 A1* | 6/2017 | Yafouz | B60J 11/02 |
| 2019/0001801 A1* | 1/2019 | Giambrone | B60R 19/48 |

\* cited by examiner

INTEGRATED COVER

FIELD

An exemplary embodiment relates to the field of vehicle covers.

BACKGROUND

Covering a vehicle can be a difficult task. Car covers need to be specifically sized in order to properly protect a vehicle. Further, once the correct size and shape is identified, the cover needs to be placed on the vehicle in the correct orientation and position so that the shape of the cover molds the shape of the vehicle. This can prove difficult and can be further hindered by darkness, wind, and rain. More than one person may be needed to properly equip a vehicle with a cover. One side may become dislodged upon tucking or covering another side. Parking in tight spaces, such as a parking garage, may further hinder efforts to cover a vehicle since the cover may require that the user tie certain parts which may be inaccessible in a tight space.

Another difficulty in using vehicle covers is the need to store the covers before and after use. The cover may accumulate amounts of dirt, germs, water, and other undesirable contaminants over time. This presents an issue regarding proper storage of the cover. Storage inside the vehicle is often undesirable because of the effects a dirty cover may have on the interior of a vehicle. Covers sometimes include a storage bag, however, use of the storage bag requires handling and folding the cover into the bag, thus exposing the user to the contaminants found on the cover. The storage bag may take valuable storage space inside the vehicle. Further, the cover often will not dry while inside a storage bag.

SUMMARY

According to at least one exemplary embodiment, a method, system and apparatus for a vehicle cover may be shown and described. In an exemplary embodiment, a vehicle cover may be provided which is stored along or inside the bumper cover of a vehicle. The cover may be stored on a roller. A drawstring on the end of the cover may be exposed while the cover is stored. Pulling the drawstring may unroll the roller, thus exposing the cover. The cover may then be wrapped over a substantial portion of the vehicle and tied at the end of the vehicle opposite the roller. In an exemplary embodiment, removal of the cover is as simple as untying the end of the cover and pressing a button on the roller which activates the spring-loaded return mechanism which may roll the cover back into the roller.

An exemplary embodiment allows for several advantages over standard vehicle covers. This cover may be stored entirely outside of the vehicle while still traveling with the vehicle. As a result, the cover does not need to be manually inserted into a bag or other storage means. This exposes the user to less contaminants by minimizing user contact with the cover. The user may only need to untie the cover and press a button, as opposed to traditional covers which may require a user to fold the entire cover to fit into a storage means, forcing the user to touch various parts of the cover.

Additionally, an exemplary embodiment may be far less difficult to equip when compared to a traditional cover. In an exemplary embodiment, a single user can simply pull the cover from one end to another and tie it at the farther end. Traditional covers may require a second person to hold down one end while someone tucks or covers another end. An exemplary embodiment is fixed to a bumper cover, holding one side of cover securely in place, and therefore there is no need for one user to hold one side down.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Figure 1:
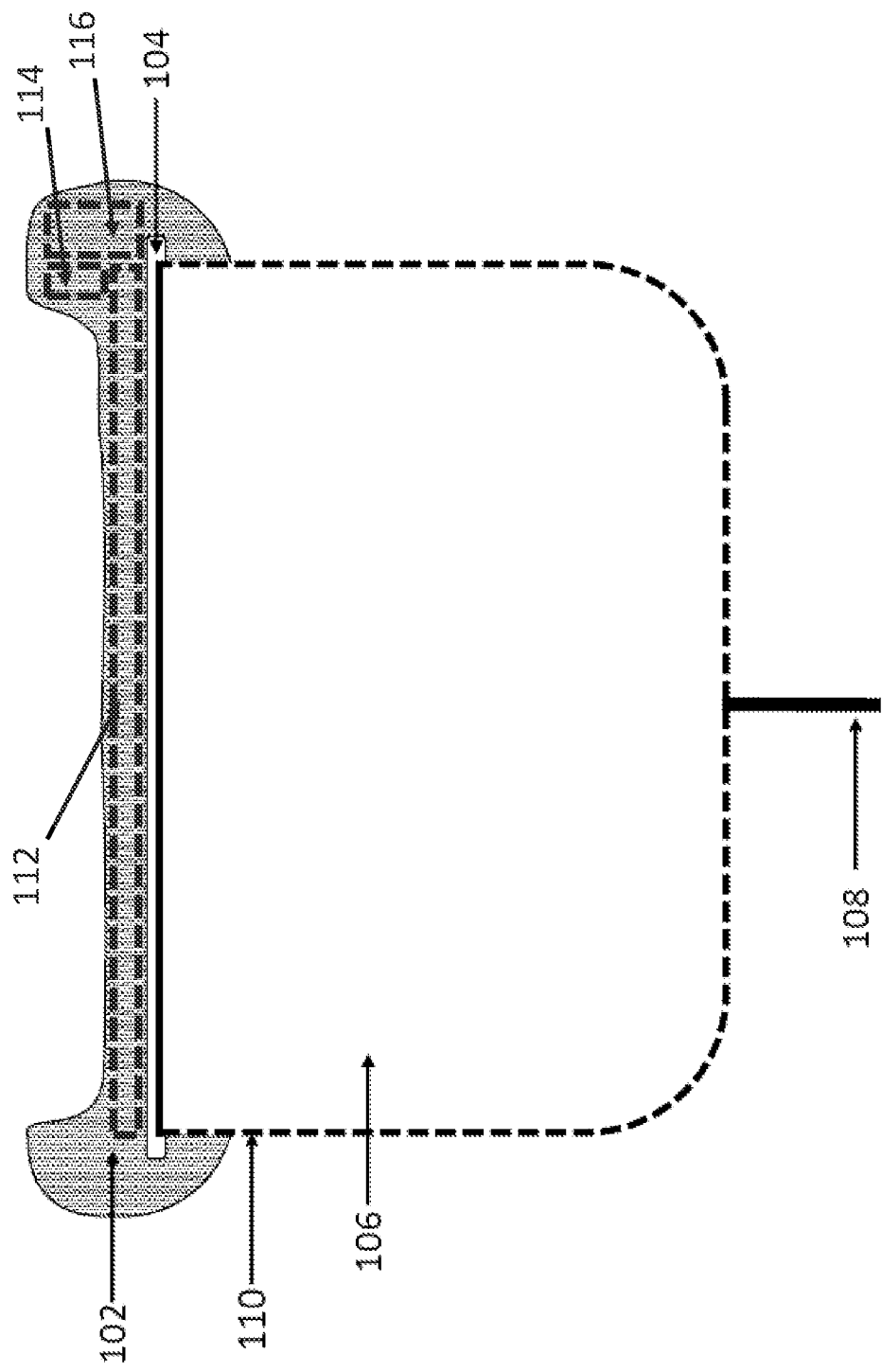
FIG. 1 is an exemplary embodiment of a vehicle cover installed on a rear bumper cover in an open configuration.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Although the following examples often refer to vehicles, it may be contemplated that an exemplary embodiment may be implemented on a plethora of alternate products. For example, a roller may be fixed to an outdoor grill in order to quickly and easily provide a grill cover. The roller may come pre-installed onto the grill, may be installed to the grill after the grill is purchased, or may be installed next to the grill so that it is easily accessible and usable with whatever grill is in the area.

Referring to the Figures generally, and according to an exemplary embodiment, an integrated cover may be presented. The cover may extend from a storage unit located on the bumper cover of a vehicle. According to further exemplary embodiments, as reflected in FIGS. 1-2 and described herein, the storage unit may be a front or rear bumper cover. It may be contemplated that the bumper cover can be either the front or the rear bumper cover, depending on the application. The storage unit may be a roller which holds the cover in a rolled configuration. A drawstring may be attached to the end of the cover such that the user may pull the drawstring out, in any direction away from the bumper cover in order to unroll and expose the vehicle cover. The storage unit may include a button for releasing the roller 112, allowing the cover to be pulled out of the storage unit. The vehicle cover may extend from one bumper cover over a substantial portion of the vehicle and may extend to the other bumper cover. The vehicle cover may be tied at the other bumper cover, thus securing it to the vehicle. Elastic may be incorporated into the sides and edges of the cover to further ensure that the vehicle cover is secured to the vehicle. Additional securing means, such as additional cords, ties, elastic, elastic cords, or clips may be contemplated to further secure the cover.

The roller may be implemented on a bumper cover of a vehicle. In an exemplary embodiment, the roller may be inside the bumper cover and the drawstring may be pulled from a bottom portion of the bumper cover. Such an embodiment has the advantage of blending in the with vehicle without altering the vehicle's aesthetics. In this embodiment, the only visible portion of the cover and related apparatus may be the drawstring which hangs underneath the bumper. The vehicle may be designed to include a space where the roller may be implemented between the bumper cover and the bumper. As a result, an exemplary embodiment may be installed on a vehicle when it leaves the factory.

Alternatively, it may be contemplated that a custom bumper cover may include a space for the roller while still maintaining substantially the same shape of the original bumper cover. Thus, the custom bumper cover may allow for an exemplary embodiment to be implemented as an aftermarket addition to an existing vehicle (as opposed to only being a factory option). The custom bumper cover allows the vehicle to maintain its aesthetic appearance while securely holding the roller.

In an alternative exemplary embodiment, the roller may be implemented as an attachment to an existing bumper cover. The roller can be fixed to the outside, front, or rear of a bumper cover. For example, the roller may be fixed to an area underneath the bumper cover. This embodiment may be preferable when installing the roller to an already existing vehicle. In this exemplary embodiment, the roller may be fixed to any existing bumper cover via any acceptable mounting hardware or adhesive, as is known in the field.

In yet another alternate exemplary embodiment, the roller may be fixed to a tow hitch of a vehicle. Many light-trucks, crossovers, and sport utility vehicles come equipped or can easily be equipped with a tow hitch. These tow-hitches are often unused and can carry over 500 pounds. Further, installation to and removal from tow hitches is simple and may not require any heavy machinery or custom fabrication. Since tow hitches are generally universal, one exemplary embodiment may be implemented in virtually any car, relying on just the tow hitch connection. It may be contemplated that an exemplary embodiment may be placed or implemented on any part of a vehicle, not just the bumpers and the tow hitch. For example, the roller may be installed underneath a side skirt, inside the engine bay, under the hood, and/or on the roof. Further, it may be contemplated that the roller is not installed on any part of the vehicle and is instead a standalone unit which can conveniently store a vehicle cover, and then may be placed in storage, such as in the trunk of a vehicle or in a garage.

The roller may be surrounded by a protective housing constructed of a strong plastic, such as high-density polyethylene. It may be contemplated that the housing is UV and weather-resistant. Further, a metal housing may be contemplated, implementing materials such as anodized aluminum which may be riveted. Various parts may be injection molded to shape. The vehicle cover may be made from a quality waterproof fabric-like canvas or nylon. The material may be cut to size with shears and may be machine stitched. The drawstring and elastic edges may also be machine stitched.

In an exemplary embodiment, the roller may replace the bumper. The portion inside the bumper cover which serves to absorb the force of an impact is the bumper of a vehicle. It may be contemplated that an exemplary roller may be constructed of materials similar to those used to construct a bumper, thus allowing a user to replace their bumper with a roller and vehicle cover without compromising safety. This exemplary embodiment preserves a vehicle's aesthetic by using the original bumper cover and preserves safety while providing an easy-to-use cover that is always accessible. Further, a two-in-one bumper and vehicle cover may be less expensive than a bumper and a separate vehicle cover, especially when implemented on a large scale.

The roller may incorporate a spring-loaded mechanism to automatically roll the cover back into the storage location. It may be contemplated that an electric or other mechanism may be implemented. An electric mechanism may serve to both open and close the vehicle cover. In an exemplary embodiment, a user can activate the roller which may then unroll the bumper cover over the vehicle. The drawstring may be already attached to the opposite end of the vehicle, such that when the roller is activated the cover automatically follows the drawstring to the other end of the vehicle and effectively covers a substantial portion of the vehicle. Further, the cover may be disengaged electrically or via a spring-loaded mechanism. The electrical disengagement may be an electric motor 116 which spins the roller in such a way engages or rolls-up the cover.

An exemplary embodiment may be manually equipped and removed from a vehicle. To equip the cover, a user may pull the drawstring over from the roller across the entire car, where it can be tied at the other end to secure the drawstring and thus the cover in place. To remove the cover, the ties may be untied, and the cover can be lifted. Then, the spring-loaded or electric mechanism may automatically re-roll the cover into the roller.

An exemplary embodiment may provide several useful advantages. First, the cover may protect the exterior of a vehicle (or any other contemplated object) from dirt, grime, bird droppings, sleet, hail, dust, and any other contaminants or paint irritants. Further, the cover will reduce excessive heat-build up which may occur when the sun is concentrated through the windows of a vehicle. The cover may protect the vehicle interior from harmful sun rays which can damage interior materials, such as leather, by discoloring or fading the material. Additionally, the product is readily available and always on hand. Since the roller and cover are integrated into the vehicle, such as inside the bumper cover, the vehicle cover will always travel wherever the vehicle goes and cannot be forgotten anywhere. The vehicle cover may also provide additional security to the vehicle. It may be securely connected to the roller, and then may be locked at the ties on the other side. Further, it may be contemplated that the cover may be irremovable except by the user or vehicle owner who has a specific key or combination which can unlock a roller lock 114 of the roller.

An exemplary embodiment provides a sanitary solution to vehicle covers. Massive amounts of contaminants may accumulate over time on a vehicle cover. These may include dirt, grime, pollen, bird droppings, leaves, tree sap, or insects. Removal of a typical cover may involve a user handling various parts of the vehicle cover in order to properly remove and then store the cover. However, an exemplary embodiment allows a user to equip and remove the cover while only requiring minimum handling of the cover. The use of the drawstring helps minimize the amount that a user must touch the cover. It may be contemplated that the user need only manipulate the drawstring to equip and/or remove the cover and does not need to touch or handle any part of the cover itself. Upon untying the drawstring or ties from a portion of the vehicle, the spring-loaded roller may execute the rest of the storage process by simply rolling up the entire cover, without requiring any additional human intervention.

Referring now to the exemplary embodiment in FIG. 1, FIG. 1 may illustrate a cover installed on a bumper of a vehicle in an open configuration. The bumper cover 102 in this exemplary embodiment is a rear bumper cover. In this exemplary embodiment, an opening 104 may be located in a middle portion of the bumper cover 102. However, it may be contemplated that the opening is located in any possible location or may not be required at all in cases where the roller is accessible from underneath the bumper cover 102. The cover 106 is illustrated in a partially unrolled configuration for illustrative purposes. At the end of cover 106 is the drawstring 108 which may be used for retrieving and securing the cover 106 to the vehicle. The sides of the cover 106 may be lined with elastic 110, so as to more securely conform the shape of the vehicle. The use of elastic may allow a single sized cover to fit multiple different cars of various sizes.

Figure 2:
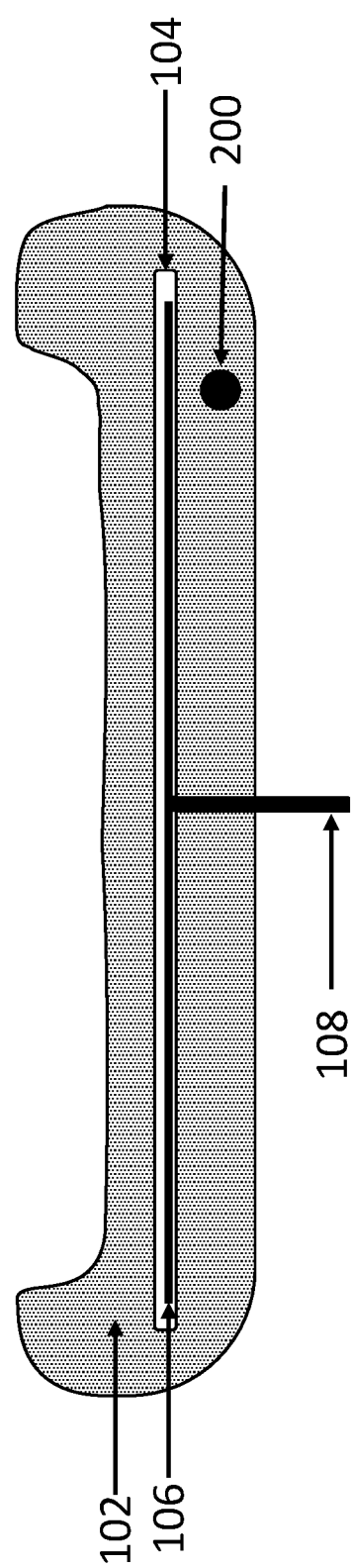
FIG. 2 is an exemplary embodiment of a vehicle cover installed on a rear bumper cover in a closed or stored configuration.

Exemplary FIG. 2 may illustrate a cover system installed on a bumper of a vehicle in the closed or stored position. In an exemplary embodiment, the drawstring 108 may be the only visible portion of the cover when it is in the stored position. Also illustrated in FIG. 2 is the button 200 which activates the spring-loaded roller, causing it to roll the cover into the storage position. The button 200 may be located in any convenient location. In this exemplary embodiment, the button 200 is located on the rear bumper underneath the cover storage slot, however, it may be contemplated that the button can be in another position, such as inside the vehicle.

Figure 3:
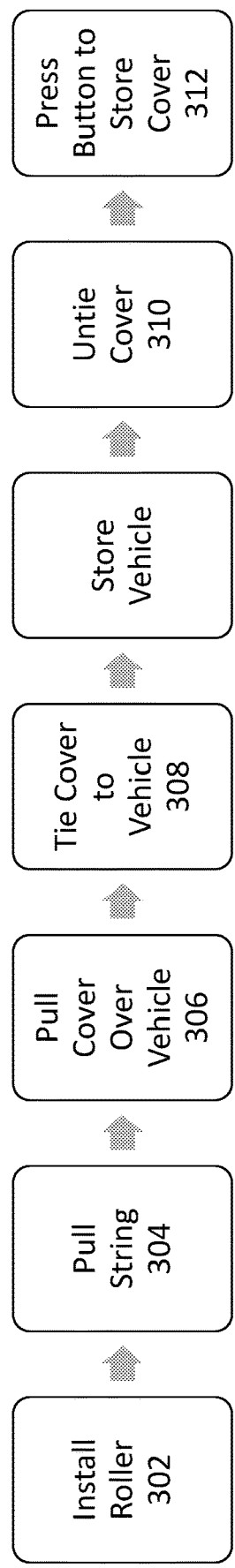
FIG. 3 is a schematic flowchart of an exemplary method for implementing an integrated vehicle cover.

Referring now to FIG. 3, FIG. 3 may illustrate a schematic flowchart of a method for implementing an exemplary vehicle cover. First, the roller system may be installed onto a portion of the vehicle 302. Installation may be via mounting hardware. The roller may be mounted inside a bumper, outside a bumper, underneath the vehicle, over the trunk, on the tow hitch, or in any other contemplated location. Next, the drawstring may be pulled to reveal the cover 304. The user may continue to pull the drawstring until reaching the opposite side of the vehicle 306. The drawstring may then be tied to a secure location on the opposite side of the vehicle 308. The drawstring may be configured such that pulling the drawstring when the cover is fully extended tightens the fabric surrounding the cover, thus tightly securing the cover on the vehicle. Additional means for securing the cover may be implemented at this point. For example, clips, hooks, and the like may be secured to the vehicle. Next, when the user returns to their vehicle, the cover may be removed by first untying the drawstring or other ties 310. Then, the user may simply push the roller release button to cause the spring-loaded rollers to roll the cover in 312.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. An integrated vehicle cover comprising:
    a UV and weather-resistant storage unit being a front or rear bumper cover of a vehicle;
    a vehicle cover sheet;
    a roller device disposed within the storage unit, wherein the roller device is configured to store, dispense, and retrieve the vehicle cover sheet by rolling or unrolling the cover around the roller device, and wherein the roller device is a vehicle bumper replacement, the vehicle bumper being the element inside the front or rear bumper cover which services to absorb the force of an impact, and wherein the roller device is configured to absorb force from an impact as the vehicle bumper replacement;
    an opening in the storage unit aligned with the roller device such that a vehicle cover sheet disposed on the roller device can pass through the opening;
    at least one drawstring disposed on an end of the vehicle cover sheet, wherein the drawstring is configured to pull the vehicle cover sheet from the storage unit and wherein the drawstring is configured to secure the vehicle cover sheet at a side of the vehicle opposite the storage unit, when the vehicle cover sheet is disposed over a vehicle, and
    a roller lock for preventing rotation of the roller and removal of the vehicle cover sheet, wherein the roller device is released by a key or combination.

2. The integrated vehicle cover of claim 1, wherein the at least one drawstring is affixed to the side of the vehicle opposite the storage unit when the vehicle cover sheet is stored in the storage unit and wherein the at least one drawstring facilitates deployment of the vehicle cover sheet by guiding the vehicle cover sheet over a vehicle.

3. The integrated vehicle cover of claim 1, further comprising elastic disposed around a perimeter of the vehicle cover sheet.

4. The integrated vehicle cover of claim 1, wherein the vehicle cover sheet is weatherproof.

5. The integrated vehicle cover of claim 1, further comprising a release button configured to release the roller lock on the roller device and allow the roller device to spin freely.

6. The integrated vehicle cover of claim 1, further comprising an electric motor for the roller, wherein the electric motor spins the roller to retrieve the vehicle cover sheet, and wherein the electric motor is actuated by a roller control button.

7. The integrated vehicle cover of claim 1, wherein the roller is spring-loaded.

8. The integrated vehicle cover of claim 1, wherein the at least one drawstring is configured to lock the vehicle cover to the side of the vehicle opposite the storage unit.

9. The integrated vehicle cover of claim 2, further comprising an electric motor for the roller, wherein the electric motor spins the roller to retrieve the vehicle cover sheet, and wherein the electric motor is actuated by a roller control button, and wherein the electric motor and drawstring are configured to deploy the vehicle cover sheet over a vehicle.

10. The integrated vehicle cover of claim 1, wherein the cover is lockable to the side of the vehicle opposite the storage unit.

* * * * *